United States Patent [19]
Biquez et al.

[11] Patent Number: 6,005,307
[45] Date of Patent: Dec. 21, 1999

[54] SWITCHING SYSTEM INCLUDING A CURRENT-INJECTING DISCONNECTOR INTEGRATED IN A CIRCUIT BREAKER FOR A GENERATOR

[75] Inventors: François Biquez, Brignais; Yves Astic, Lyons; Jean-Marc Willieme, La Mulatiere, all of France

[73] Assignee: GEC Alsthom T & D SA, Paris, France

[21] Appl. No.: 09/025,781

[22] Filed: Feb. 19, 1998

[30] Foreign Application Priority Data

Feb. 20, 1997 [FR] France .................................. 97 02010

[51] Int. Cl.$^6$ ...................................................... H02B 1/24
[52] U.S. Cl. ............................. 307/127; 307/85; 307/86; 307/87
[58] Field of Search .................................. 307/51, 52, 62, 307/63, 69, 71, 78, 80, 85–87, 119, 125; 322/44, 90, 100; 200/17 R; 218/12, 45, 55, 67, 79, 80, 100

[56] References Cited

U.S. PATENT DOCUMENTS

| | | | |
|---|---|---|---|
| 3,632,915 | 1/1972 | Kramer | 200/48 R |
| 4,539,449 | 9/1985 | Lorenz | 200/146 R |
| 5,216,575 | 6/1993 | Tanimizu | 361/341 |
| 5,334,927 | 8/1994 | Widenhorn | 307/87 |
| 5,796,060 | 8/1998 | Fuchsle et al. | 361/604 |

FOREIGN PATENT DOCUMENTS

| | | |
|---|---|---|
| 0 567 773 A2 | 11/1993 | European Pat. Off. . |
| 2 548 473 A1 | 1/1985 | France . |
| 1910871 | 9/1970 | Germany . |

*Primary Examiner*—Jeffrey Gaffin
*Assistant Examiner*—Peter Zura
*Attorney, Agent, or Firm*—Sughrue, Mion, Zinn, Macpeak & Seas, PLLC

[57] ABSTRACT

A switching system having a plurality of positions for separating or interconnecting a generator, a network transformer, and a starter device, the system including a circuit breaker for the generator and a busbar disconnector for separating or interconnecting the generator and the network transformer, and a starter disconnector for separating or interconnecting the generator and the starter device. The busbar disconnector includes a first fixed contact and a first moving contact that co-operates by sliding with the first fixed contact, the first fixed contact and the first moving contact being integrated with the circuit breaker of the generator. The starter disconnector includes a second fixed contact and a second moving contact that co-operates with the second fixed contact by rotation. This organization remains economical to implement even for applications in which the generator is an alternator in a combined cycle or a gas turbine power station.

3 Claims, 2 Drawing Sheets

SWITCHING SYSTEM INCLUDING A CURRENT-INJECTING DISCONNECTOR INTEGRATED IN A CIRCUIT BREAKER FOR A GENERATOR

The invention relates to a switching system having a plurality of positions for separating or interconnecting a generator, a network transformer, and a starter device, the system comprising a circuit breaker for the generator and a busbar disconnector for separating or interconnecting the generator and the network transformer, and a starter disconnector for separating or interconnecting the generator and the starter device.

BACKGROUND OF THE INVENTION

Such a system is already known from European patent document No. 0 567 773. In that known switching system, the busbar disconnector and the starter disconnector are designed as a single three-position disconnector having three fixed contacts and a moving contact which needs to be implemented in the form of a rotary blade. Although economical at relatively low currents, such an organization becomes expensive to implement for nominal currents starting at 6300 A, because of the special adaptation required for the rotary blade at such a nominal current value. Such a nominal current value is typical for an alternator in a power station of the gas turbine or combined-cycle type.

OBJECTS AND SUMMARY OF THE INVENTION

An object of the invention is to propose a switching system as defined above which is less expensive to implement, particularly for application with nominal currents exceeding 6300 A.

The invention is based on the idea of separating the starter disconnector from the busbar disconnector.

More particularly, the invention provides a switching system having a plurality of positions for separating or interconnecting a generator, a network transformer, and a starter device, the system comprising a circuit breaker for the generator and a busbar disconnector for separating or interconnecting the generator and the network transformer, and a starter disconnector for separating or interconnecting the generator and the starter device, wherein:

the busbar disconnector comprises a first fixed contact and a first moving contact that co-operates by sliding with the first fixed contact, the first fixed contact and the first moving contact being integrated with the circuit breaker of the generator; and the starter disconnector comprises a second fixed contact and a second moving contact that co-operates with the second fixed contact by rotation.

This organization makes it possible to use the starter disconnector and the busbar disconnector independently, thereby contributing to making the assembly flexible to use. It also makes it possible to interconnect electrically the starter disconnector and the starter device in simple manner using cables.

BRIEF DESCRIPTION OF THE DRAWINGS

Other characteristics and advantages of the invention appear further on reading the following description of an embodiment of the invention.

MORE DETAILED DESCRIPTION

Figure 1:
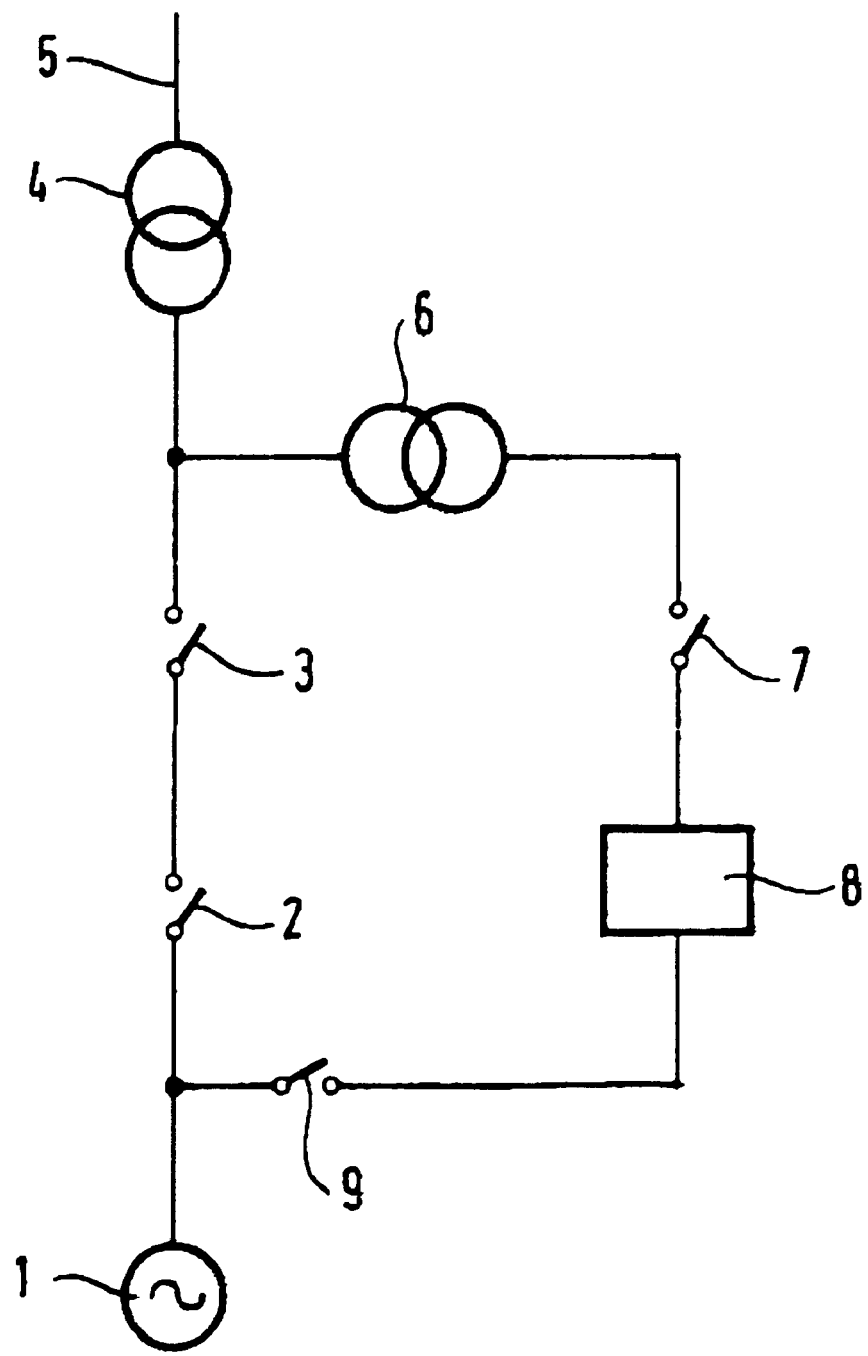
FIG. 1 is a highly simplified single-wire circuit diagram of a generator device such as gas turbine installation including the switching system of the invention.

The switching system of the invention has a plurality of phases and forms a portion of apparatus associated with a generator, as shown in FIG. 1.

More particularly, in this figure, there can be seen a single-wire circuit diagram of a generator 1 which is connected via a generator circuit breaker 2 and a busbar disconnector 3 to a voltage-raising transformer 4 connected to the network 5.

A parallel circuit also connects the generator 1 to the network transformer 4 via a bleed transformer 6 which feeds a variable-frequency static converter forming a starter device 8, a circuit breaker 7 for the variable frequency static converter, the starter device 8, and a starter disconnector 9. The link between the bleed transformer 6 and the starter disconnector 9 may be implemented using cables which is economically advantageous compared with the other links of FIG. 1 which are implemented in the form of metal-clad busbars.

Figure 2:
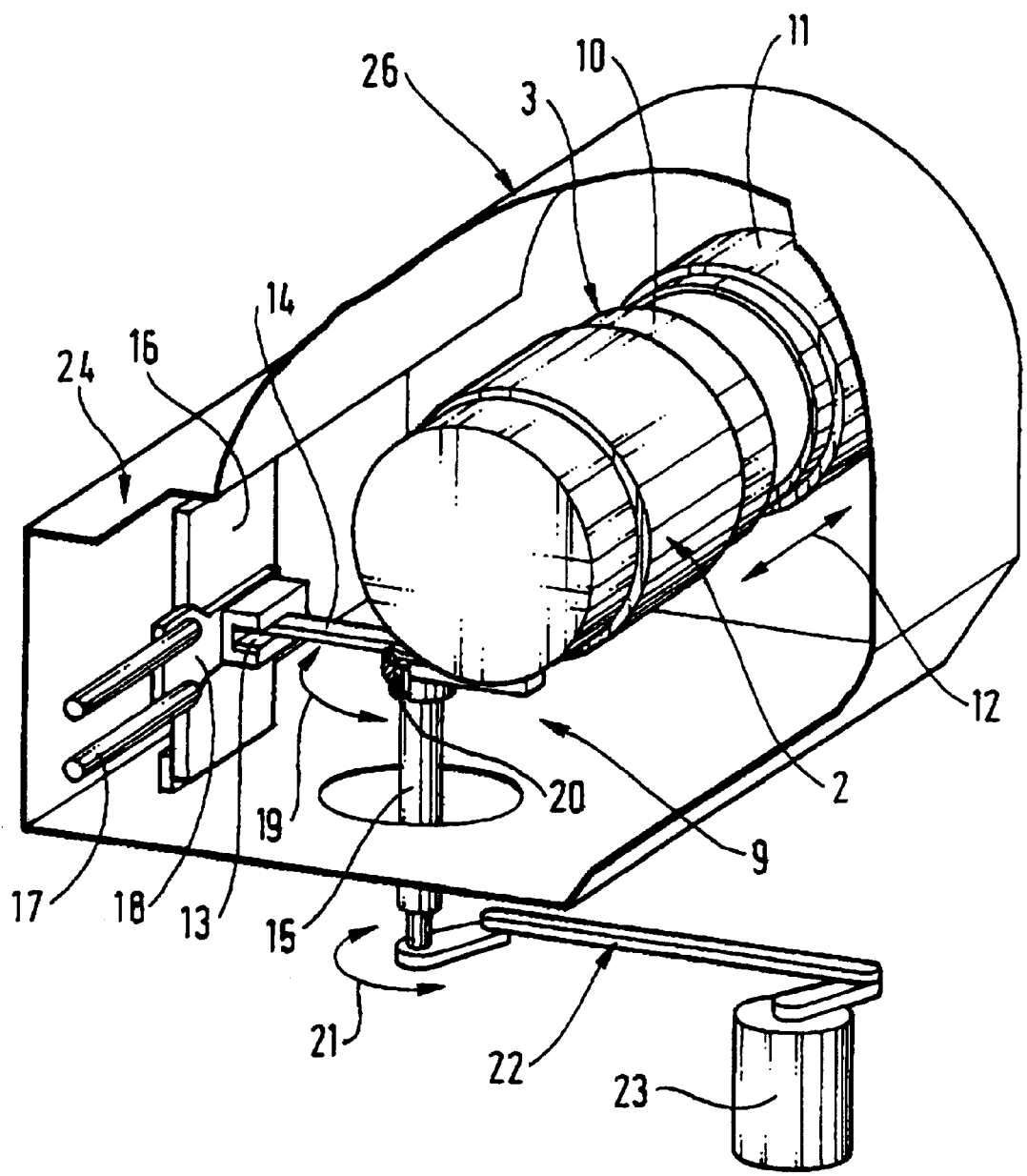
FIG. 2 is a partially cutaway diagrammatic perspective view showing a detail of the switching system of the invention.

FIG. 2 shows one phase of the switching system having a plurality of positions, and which thus comprises the busbar disconnector 3 and the starter disconnector 9.

More particularly, the busbar disconnector comprises a fixed contact in the form of a first conductive metal tube 10 and a contact that is movable in translation in the form of a second conductive metal tube 11 co-operating with the first tube 10 by sliding as indicated by arrow 12. In FIG. 2, the busbar disconnector is shown in the open position. Such a busbar disconnector is economical to implement even for currents greater than 6300 A. As can be seen in the figure, the fixed and moving contacts 10 and 11 of the busbar disconnector are integrated in the circuit breaker 2 of the generator.

The starter disconnector 9 comprises a fixed contact 13 in the form of one or more conductive metal clamps and a moving contact 14 in the form of a rotary conductive metal blade for co-operating with the fixed contact 13 by rotating about an axis defined by a shaft 15 of insulating material so as to engage in the clamp 13.

The clamp 13 is mechanically connected to the grounded cladding 26 of the generator circuit breaker via an insulating plate 16 which insulates it from ground when the starter disconnector is in the closed position, as shown in FIG. 2. This structure makes it possible, in particular, to use cables 17 to connect the starter device to the starter disconnector on a fixed connection area 18 using screw terminals at the ends of the cables.

The blade 14 which rotates as shown by arrow 19 is electrically and mechanically connected to the live portion of the generator circuit breaker via rotary sliding contacts 20 mounted on the shaft 15.

The shaft 15 is rotated as shown by arrow 21 by a linkage 22 under the control of a motor-and-gearbox drive unit 23 of the starter disconnector.

A cable box 24 is fixed to the cladding 26 of the generator circuit breaker to allow cables to pass through the cladding via a system of packing or the like.

To inspect the generator device, the busbar disconnector 3 is opened and the starter disconnector 9 is opened so that the generator 1 is separated from the network transformer 4 and from the starter device 8.

In order to start the generator 1 (the busbar disconnector 3 being closed), the generator circuit breaker 2 is open and the starter disconnector 9 is closed, i.e. the contact 14 is engaged in the contact 13. The generator 1 is still separated from the network transformer 4, but it is connected to the starter device 8. The circuit breaker 7 of the starter device is closed. The generator 1 then starts under the control of the starter device.

Once the generator 1 has reached a speed suitable for being synchronously switched to the network, and once it can accelerate without external feed, the circuit breaker 7 of the starter device is opened and then the starter disconnector 9 is opened, i.e. the contact 14 is disengaged from the contact 13 so as to separate the generator 1 from the starter device. Thereafter, the generator circuit breaker 2 is closed to connect the generator 1 to the network transformer 4. After the generator circuit breaker has closed, the generator 1 feeds the network transformer 4.

In this embodiment, the generator may be an alternator of a combined-cycle or a gas turbine power station.

What is claimed is:

1. A switching system having a plurality of positions for separating or interconnecting a generator, a network transformer, and a starter device, the system comprising a circuit breaker for the generator and a busbar disconnector for separating or interconnecting the generator and the network transformer, and a starter disconnector for separating or interconnecting the generator and the starter device, wherein:

the busbar disconnector comprises a first fixed contact and a first moving contact that co-operates by sliding with the first fixed contact, the first fixed contact and the first moving contact being integrated with the circuit breaker of the generator; and the starter disconnector comprises a second fixed contact and a second moving contact that co-operates with the second fixed contact by rotation.

2. The system according to claim 1, in which the second fixed contact is mechanically connected via an insulating plate to grounded cladding of the circuit breaker of the generator.

3. The system according to claim 1, in which the second moving contact is mechanically connected to the live portion of the circuit breaker of the generator via rotary sliding contacts and is actuated by an insulating rotary shaft connected via a linkage to a drive unit.

\* \* \* \* \*